United States Patent
Iovanna et al.

(10) Patent No.: US 11,943,801 B2
(45) Date of Patent: Mar. 26, 2024

(54) METHOD AND APPARATUS FOR ABSTRACTING NETWORK RESOURCES TO SUPPORT END USER MOBILITY

(71) Applicant: Telefonaktiebolaget LM Ericsson (PUBL), Stockholm (SE)

(72) Inventors: Paola Iovanna, Pisa (IT); Teresa Pepe, Pisa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 285 days.

(21) Appl. No.: 17/292,755

(22) PCT Filed: Nov. 20, 2018

(86) PCT No.: PCT/EP2018/081962
§ 371 (c)(1),
(2) Date: May 11, 2021

(87) PCT Pub. No.: WO2020/104022
PCT Pub. Date: May 28, 2020

(65) Prior Publication Data
US 2021/0400678 A1    Dec. 23, 2021

(51) Int. Cl.
*H04W 72/543* (2023.01)
*H04W 4/50* (2018.01)
*H04W 24/02* (2009.01)

(52) U.S. Cl.
CPC .......... *H04W 72/543* (2023.01); *H04W 4/50* (2018.02); *H04W 24/02* (2013.01)

(58) Field of Classification Search
CPC ..... H04L 41/0893; H04L 45/70; H04L 41/40; H04W 24/10; H04W 52/42; H04W 4/50; H04W 72/543; H04W 24/02
See application file for complete search history.

(56) References Cited

U.S. PATENT DOCUMENTS

2016/0242043 A1 * 8/2016 Dong ............... H04W 24/10
2016/0261469 A1 * 9/2016 Breuer ............. H04L 41/5003
(Continued)

FOREIGN PATENT DOCUMENTS

| WO | 2015 124200 A1 | 8/2015 | |
| WO | WO-2020104022 A1 * | 5/2020 | H04L 41/40 |
| WO | WO-2021146029 A1 * | 7/2021 | H04L 49/70 |

OTHER PUBLICATIONS

A. Rostami et al., "Orchestration of RAN and Transport Networks for 5G: An SDN Approach," in IEEE Communications Magazine, vol. 55, No. 4, pp. 64-70, Apr. 2017, doi: 10.1109/MCOM.2017. 1600119. (Year: 2017).*

(Continued)

*Primary Examiner* — William D Cumming
(74) *Attorney, Agent, or Firm* — Baker Botts L.L.P.

(57) ABSTRACT

A method of orchestrating a plurality of network resources for providing a requested network service in a mobile communications network. The method comprises monitoring service requests (202) and obtaining information comprising abstracted resources of radio domain, transport domain and computing domain (206). The method also comprises obtaining and processing a service description comprising a set of parameters defining the service to be provided (208) and identifying in the abstracted resources from the radio domain, transport domain and computing domain resources for delivering the service defined in the service description in a coverage area determined based on the service description (212).

13 Claims, 3 Drawing Sheets

(56) References Cited

U.S. PATENT DOCUMENTS

2018/0332442 A1* 11/2018 Shaw .................. H04L 41/0893
2021/0400678 A1* 12/2021 Iovanna ................. H04L 41/40
2022/0038902 A1*  2/2022 Mueck .................... G06F 21/57
2022/0345863 A1* 10/2022 Mueck .................... H04W 4/50

OTHER PUBLICATIONS

PCT Notification of Transmittal of the International Search Report and the Written Opinion of the International Searching Authority, or the Declaration issued for International application No. PCT/EP2018/081962—dated Jun. 17, 2019.

* cited by examiner

METHOD AND APPARATUS FOR ABSTRACTING NETWORK RESOURCES TO SUPPORT END USER MOBILITY

PRIORITY

This nonprovisional application is a U.S. National Stage Filing under 35 U.S.C. § 371 of International Patent Application Serial No. PCT/EP2018/081962 filed Nov. 20, 2018 and entitled "A Method and Apparatus for Abstracting Network Resources to Support End User Mobility" which is hereby incorporated by reference in its entirety.

TECHNICAL FIELD

The present solution relates to delivering services in a wireless communications networks, in general, and in particular to a method, apparatus and a computer program product for orchestrating a network resources to provide network service while considering mobility of user equipment.

BACKGROUND

The model based on which the mobile wireless communications network of $5^{th}$ generation is developed (also referred to as the 5G model) poses new challenging requirements also in the definition and deployment of software platforms and environment that maximize the level of automation of service creation and activation to increase flexibility and reduce costs, e.g. ETSI Management and Orchestration (MANO), Open Networking Automation Platform (ONAP). This has a huge impact in the orchestration function that assumes a crucial role with very challenging tasks: deal concurrently with heterogenous entity such as transport, radio, data-centers and Virtual Network Functions (VNF). An important characteristic of the future 5G wireless networks is that the networks will be required to support mobility to meet the main requirement of ubiquity of the services independently where the access is provided.

SUMMARY

It is the object of the present solution to obviate at least some of the above disadvantages and provide an improved method and apparatus for orchestrating a plurality of network resources for providing a requested network service in a mobile communications network.

According to a first aspect of the present solution there is provided a method of orchestrating a plurality of network resources for providing a requested network service in a mobile communications network. The method comprises monitoring service requests and obtaining information comprising abstracted resources of radio domain, transport domain and computing domain. The method further comprises obtaining and processing a service description comprising a set of parameters defining the service to be provided and identifying in the abstracted resources from the radio domain, transport domain and computing domain resources for delivering the service defined in the service description in a coverage area determined based on the service description.

According to a second aspect of the present solution there is provided an apparatus for orchestrating a plurality of network resources for providing a requested network service in a mobile communications network. The apparatus being adapted to monitor service requests and to obtain information comprising abstracted resources of radio domain, transport domain and computing domain. The apparatus is further adapted to obtain and process a service description comprising a set of parameters defining the service to be provided and to identify in the abstracted resources from the radio domain, transport domain and computing domain resources for delivering the service defined in the service description in a coverage area determined based on the service description.

According to a third aspect of the present solution there is provided an apparatus for orchestrating a plurality of network resources for providing a requested network service in a mobile communications network. The apparatus comprises a processing circuitry and a memory. The memory contains instructions executable by the processing circuitry such that the apparatus is operative to monitor service requests and obtain information comprising abstracted resources of radio domain, transport domain and computing domain. The apparatus is operative to obtain and process a service description comprising a set of parameters defining the service to be provided and to identify in the abstracted resources from the radio domain, transport domain and computing domain resources for delivering the service defined in the service description in a coverage area determined based on the service description.

According to a fourth aspect of the present solution there is provided an apparatus for orchestrating a plurality of network resources for providing a requested network service in a mobile communications network. The apparatus comprises a monitor for monitoring service requests and a module for obtaining information comprising abstracted resources of radio domain, transport domain and computing domain. The apparatus also comprises a processing module for obtaining and processing a service description comprising a set of parameters defining the service to be provided and a module for identifying in the abstracted resources from the radio domain, transport domain and computing domain resources for delivering the service defined in the service description in a coverage area determined based on the service description.

According to fifth aspect of the present disclosure, there is provided a computer program comprising instructions which, when executed on at least one processor, cause the at least one processor to carry out a method according to any one of the preceding aspects and/or examples of the present disclosure.

According to sixth aspect of the present disclosure, there is provided a carrier containing a computer program according to the preceding aspect of the present disclosure, wherein the carrier comprises one of an electronic signal, optical signal, radio signal or computer readable storage medium.

According to seventh aspect of the present disclosure, there is provided a computer program product comprising non-transitory computer readable media having stored thereon a computer program according to a preceding aspect of the present disclosure.

Further features of the present solution are as described in embodiment below.

The present solution provides the following benefits:
  allows to manage the mobility of user equipment (terminals);
  provide an abstracting method that include the service coverage concept;
  allows an orchestrator to manage the abstracted resources taking into account the mobility of the user equipment (terminals);

provide an abstraction solution in which the resources are abstracted as a pool of abstracted resources per coverage area;

support mobility and isolation of services;

allows the support of each type of services (including IoT services) allowing the convergence of traditional and IoT services in the same infrastructure;

allows to decouple network infrastructures from the services that it provides maximizing the utilization.

BRIEF DESCRIPTION OF THE DRAWINGS

The present solution will be understood and appreciated more fully from the following detailed description taken in conjunction with the drawings in which.

DETAILED DESCRIPTION

In the following description, for purposes of explanation and not limitation, specific details are set forth such as particular architectures, interfaces, techniques, etc. in order to provide a thorough understanding of the solution. However, it will be apparent to those skilled in the art that the solution may be practiced in other embodiments that depart from these specific details. In other instances, detailed descriptions of well-known devices, circuits, and methods are omitted so as not to obscure the description of the solution with unnecessary details.

Reference throughout the specification to "one embodiment" or "an embodiment" means that a particular feature, structure, or characteristic described in connection with an embodiment is included in at least one embodiment of the present solution. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

In the 5G wireless communications networks heterogeneity of the different domains to be managed (e.g. transport, radio, data-centers and VNF) is very complex to be handled because:

these domains could belong to different providers; thus, it is suitable to avoid exposing all information to each other, but it could be better to hide part of them for security/confidentiality reasons while disclosing some information that enables seamless deployment of services;

scalability is easier to achieve with reduced amount of information since the information is heterogenous because it is derived from heterogenous domains, the optimization could be complex and hence providing a representation according to a common model can simplify the task for the orchestrator.

Abstracting may be a very useful method to deal with these critical points. For example, scalability is easier if implemented on abstracted information compared with the original full data set because abstracting reduces the amount of information to be handled. However, the 5G model makes the problem of heterogeneity of the different domains to be managed even more complex because it includes the concept of end user mobility. Existing solutions for abstracting are based on the concept that a service is required from an ingress point to an egress point that is kept static during the service usage, instead in 5G a service requires some connectivity (that is provided by the cooperation of radio and transport) in a defined geographical area. One such solution for abstracting is disclosed, for example, in patent application WO2015/124200.

The 5G wireless communications networks require providing services which takes into account mobility of end users (i.e. mobility of user equipment or terminals). This means that managing and delivery of services should be done taking into account the end user's mobility. Solutions for design and service delivery platforms discussed for 5G are based on the fact that a service is required on static ingress point and static egress point. For example, the radio access and the related resources of the transport network are usually exposed as an ingress point representing the physical port of the equipment, e.g. switch, antenna, and an egress point, e.g. physical port of the egress switch of the transport and port of the Evolved Packet Core (EPC). However, when it is required to support mobility for a service, e.g. an automotive service that offers collision avoidance at a crossroad, we need to provide a coverage area of the crossroad. Several antennas of the radio domain and corresponding one or more switches of the transport domain (ingress ports of the switches) are required to provide the service in this coverage area. Hence, it is necessary to represent the capability of the infrastructure to provide resources (radio, transport and computing) on such coverage area while end users move in this coverage area. Hence it is very difficult for an orchestrator (of radio, transport, data-centers) to provide a suitable view to a service orchestrator when the VNF designed to deliver the requested service (e.g. collision avoidance) must be allocated and managed. The VNF is designed to deliver this service and the service orchestrator manages this VNF.

Moreover, it is advantageous to decouple radio and transport in a sort of client server relationship for scalability reasons and because they can belong to different providers. Hence the problem to solve is how to abstract the resources of the transport domain and include support for mobility of final services, independently of radio specific requirements. The method should also ensure that at the same time resources in radio and computing domains will be available for providing the service to a mobile user.

Although there are several solutions to provide an abstract view of the transport network, several significant challenges remain to be addressed in the context of wireless network abstraction (e.g., isolation, resource discovery and allocation, mobility management). Moreover, a solution that allows handling mobility of end users (and their terminals/UEs) while managing the transport resources doesn't exist. The solution now to be disclosed provides a novel method to include the coverage area in the abstraction. The method allows for selecting the set of resources (radio, transport and computing) to provide service in the coverage area and, by monitoring received service requests, get the information about status of these resources. This is novel method to manage the resources is a way to enable the isolation, resource discovery and allocation, mobility management.

In this proposal we disclose a novel abstracting method that includes a parameter indicative of a coverage area in order to meet the mobility requirements of services in a way that allows the orchestrator to manage the transport resources. Moreover, this proposal meets the requirement of keeping radio, transport and computing domains decoupled from each other. Keeping these domains separated may be necessary and/or recommended for several reasons, for example:

radio, transport and computing (i.e. data-centers) domains may be operated by different providers,
the three domains may by managed by different organizations of the same operator (provider),
the three domains operate based on different commands, scalability reasons.

Hence, keeping these domains separated is useful, especially if it is possible to orchestrate them efficiently.

The term "mobility of an end user" refers to the fact that a user and its User Equipment, UE, is free to move around (with the obvious consequences on handover in the radio domain) and the service will be delivered to this UE. The term "mobility of services" refers to the ability of the network to deliver services to a UE that is mobile. Hence the "mobility requirement of a service" is the requirement (or a set of requirements) that must be met in order to deliver the service to a mobile UE (mobile user).

This document proposes an abstracting system architecture, which enables the abstracting method to produce an abstracted view of the physical infrastructure (network, transport, computing) which takes into account the mobility of the end users (and their terminals/UEs). Such an abstracted view is referred to in this document as "abstracted resources". The system, 100, (illustrated in FIG. 1) provides a cross-abstraction that aggregates virtual resources (radio, transport, computing), represented by the individual abstracted resources from the three domains, based on the service coverage area to guarantee a specific a class of service. By the class of service it is understood a service or a group of services with the same requirements in terms of bandwidth, latency, CPU, memory, etc.

The service coverage area is the geographical area in which it is possible to ask for that service.

Figure 1:
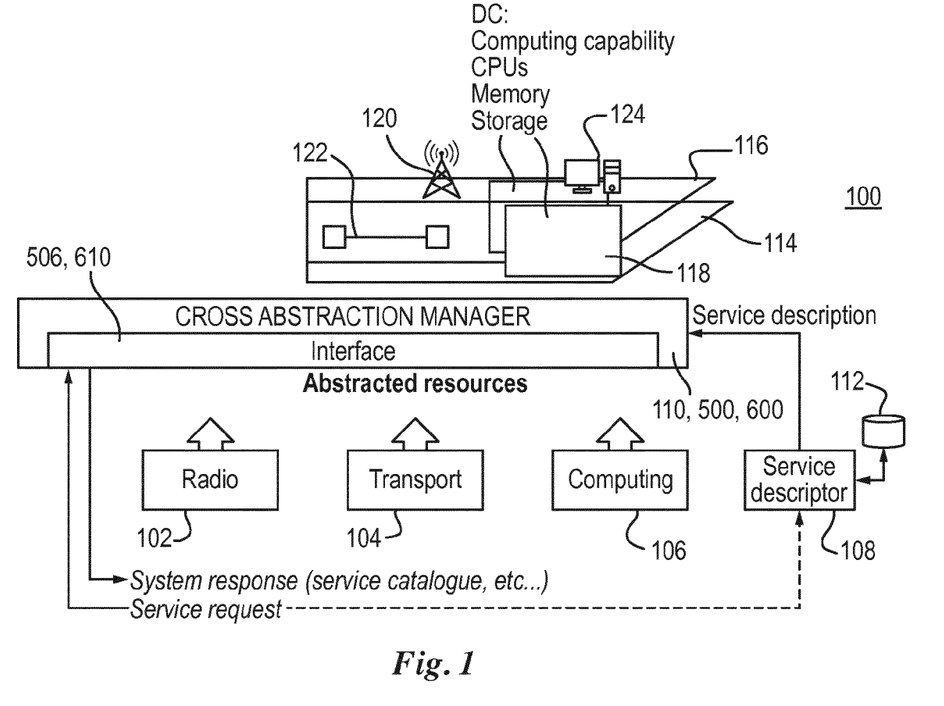
FIG. 1 is a diagram illustrating a one embodiment of a system in which the method for orchestrating network resources from multiple domains operates.

In one embodiment the system, 100, comprises abstraction modules, one for each domain: radio —102, transport —104 and computing —106, which provide abstracted resources for radio, transport, and computing infrastructure. These abstraction modules may be implemented as modules (applications, functions) in NMS/OSS or outside NMS/OSS. Abstracting resources in each of these three domains may be carried out using one of the known methods for abstracting. The references 114, 116 and 118 represent the three domains (radio, transport and computing), whereas references 120, 122 and 124 represent resources at these three domains.

Network abstraction is a process in which information representing the network is simplified by removing certain elements (nodes, edges and their characteristics) that are not important for the task (or tasks) for which the abstracted network information is going to be used. The goal of network abstraction is to retain only information that is relevant to the intended purpose. Methods and tools for abstracting network information are known.

Figure 5:
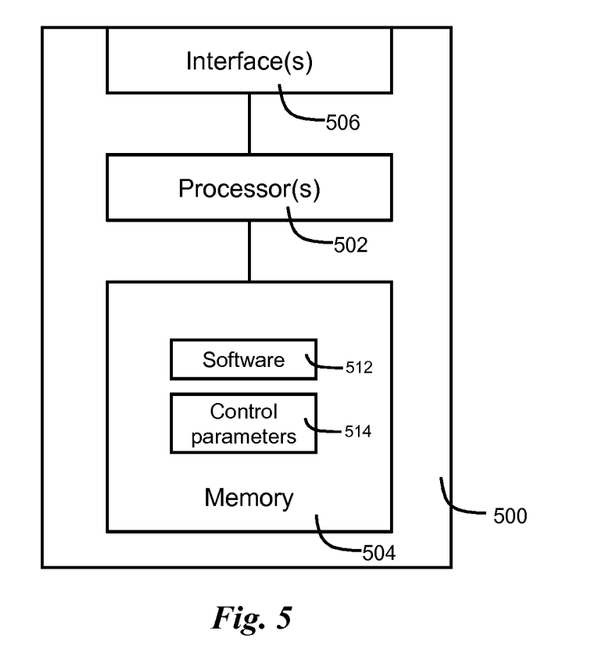
FIG. 5 is a diagram illustrating an apparatus for orchestrating a plurality of network resources for providing a requested network service in one embodiment.
Figure 6:
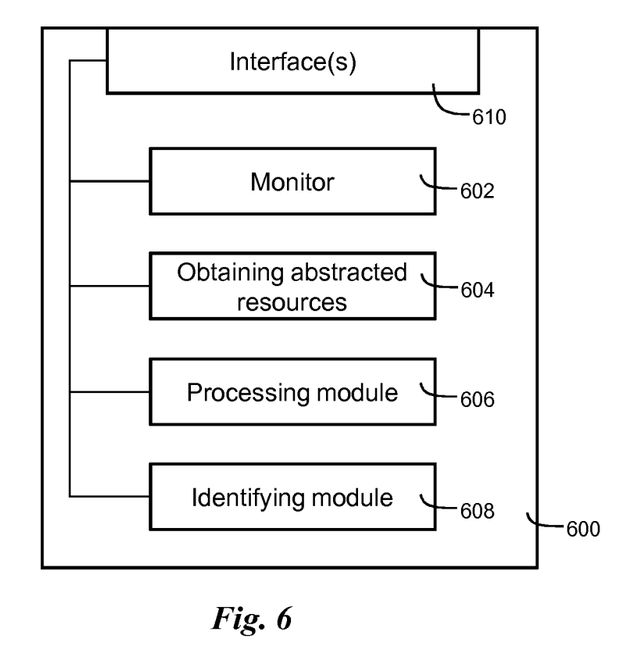
FIG. 6 is a diagram illustrating an apparatus for orchestrating a plurality of network resources for providing a requested network service in alternative embodiment.

In one embodiment of the present solution a cross-abstraction manager (CAM), 110, receives information comprising abstracted resources from three sources (radio 102, transport 104 and computing 106 domains) and because the characteristics of these three domains are very different in a preferred embodiment the information comprising abstracted resources is translated so that the CAM, 110, operates on abstracted resources from all three domains in the same format. The information comprising the abstracted resources from the three domains is received at the CAM, 110, via an interface 506, 610. The CAM may have one or more interfaces for communication and information transfer. To simplify the orchestration and make it efficient, the idea is that the subset of information exposed is translated from the technology dependent information (e.g. wavelengths, spectrum, etc.) into service information (e.g. delay, bandwidth, resiliency, coverage area). The translation outputs service parameters and this operation allows for having the same abstraction parameters independently of the specific technology of each of the domains.

The CAM, 110, provides a new level of abstraction that takes into account the mobility of the services, and it achieves this by aggregating the abstracted resources based on the type of service specified by the service descriptor, 108. The mobility information may be considered by the cross-abstraction manager, 110 in at least two different ways.

In a first embodiment the CAM, 110, receives abstracted resources from radio, transport, and computing domains (infrastructure) and then another input (a first service description) from the service descriptor, 108. The first service description comprises, amongst other information described below, also information indicative of the geographical area in which to guarantee coverage for the service specified in said service description ("coverage area"). Based on all these inputs the CAM, 110 identifies (and in one embodiment also assigns) resources in radio 102, transport 104 and computing 106 domains that will deliver the service as specified in the received first service description. In this case the output produced by the CAM, 110, are the resources that meet the requirements specified in said first service description.

In a second embodiment the CAM, 110, receives information comprising abstracted resources from radio, transport, and computing domains (infrastructure) and then another input from the service descriptor, 108. The service descriptor, 108, provides a second service description as the input to the CAM, 110. The second service description is similar to the first service description described above with the difference that the second service description does not contain information explicitly indicative of the coverage area in which to guarantee coverage for the service. The remaining information contained in the second service description is described below. With this input the CAM, 110, determines the area in which resources from radio 102, transport 104 and computing 106 domains can guarantee delivery of the service as specified in the received second service description. In this case the output produced by the CAM, 110, are the resources that meet the requirements specified in said second service description and information indicative of the coverage area in which the resources are located. One can interpret this embodiment as a way to deliver a specific service in a broadest possible area—the service description specifies only the service and the CAM identifies where this service can be guaranteed. Alternatively, the second embodiment may use the first service description, which comprises, amongst other information described below, also information indicative of the coverage area in which to guarantee coverage for the service specified in said service description ("coverage area"), but in this alternative the "coverage area" would be defined by information indicative of "maximum available coverage area". This approach would be beneficial when deploying, for example, some government sponsored emergency services for which it is important to cover as broadly as possible.

The service descriptor, 108, is a function that identifies several classes of service (based on vertical requests, e.g. fleet management from car manufacturer, health service, etc.) and for each service description it creates a record in a database, 112, (e.g., a relational database) specifying the following information:

<type of service, priority, performance requirements, DC requirements, coverage area, optional>

The service descriptor 108 may receive a service request or information derived from a service request received from a service operator. The service descriptor may also have access to information relevant to service requests from forecasts, off-line records on contracts with service providers and historical records in the database 112. This information may then be used to produce service descriptions.

Table 1 below gives examples of the information elements present in the service description.

TABLE 1

| Information element | Examples (the list is not exhaustive) |
| --- | --- |
| type of service | Intelligent Transport System |
| priority | High |
| performance requirements | bandwidth, latency |
| DC (data centre) requirements | computing capabilities, CPU, memory, storage |
| coverage area | 1 km length, 200 meters large on the cross-road at the address XXXX |

From now on the more generic term "service description" will be used to cover both terms "first service description" and "second service description". By including the "coverage area" parameter in the service description it is possible to take into account the mobility of the services in the selection of the resources independently from the specific abstraction model used to abstract radio, transport and computing domains. The CAM, 110, receiving inputs from radio, transport, computing domains as well as from the service descriptor, produces cross-abstraction for different geographical areas (depending on the "coverage area" parameter).

Figure 2:
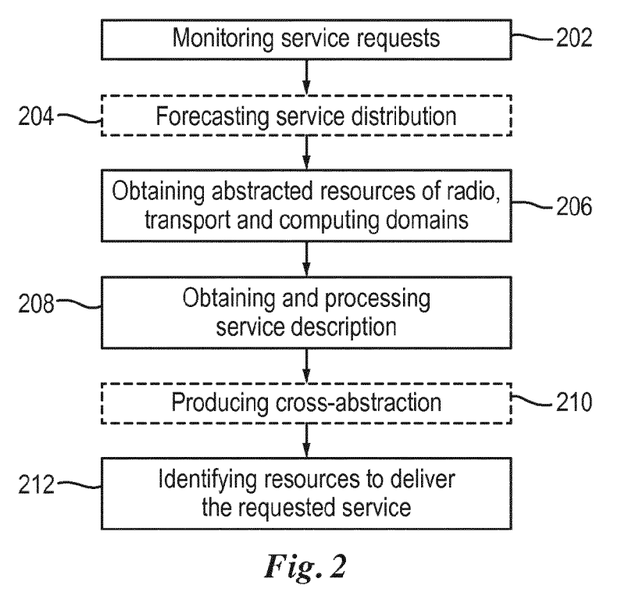
FIG. 2 is a flowchart illustrating a method of orchestrating a plurality of network resources for providing a requested network service in one embodiment.

A flow chart illustrating an embodiment of a method of orchestrating a plurality of network resources for providing a requested network service in a mobile communications network in accordance with the present invention is presented in FIG. 2. The method comprises an operation of monitoring service requests, 202. Service requests are received from service operators (service requestors) and are received by an interface, 506, 610, of the CAM, 110. The service requests may be received by the interface directly from the service operators or indirectly, via elements of the network. The CAM, 110, may produce a system response to the user requesting the service (service operator) via the interface 506, 610 including a service catalogue, etc. The method also comprises an operation of obtaining information comprising abstracted resources of radio domain, transport domain and computing domain, 206.

This information is obtained from abstracting functions, 102, 104, 106, associated with the respective domains. These abstracting functions, 102, 104, 106, may be in one embodiment part of the radio, transport and computing domains, but equally they may be located outside these domains and receive necessary information from their corresponding domains to perform abstracting. It is also possible that some of the abstracting functions, 102, 104, 106, are part of these domains while the remaining ones are outside their respective domains.

In the next operation the method comprises obtaining and processing a service description comprising a set of parameters defining the service to be provided, 208. Then, the method comprises an operation of identifying in the abstracted resources from the radio, transport and computing domains resources for delivering the service defined in the service description in a coverage area determined based on the service description, 212.

In the embodiment described above the term "obtaining" may comprise receiving, when the relevant information is sent. In an alternative embodiment obtaining may comprise downloading the relevant information when the relevant information was published and made available for download. Thus, the method may operate in embodiments relying obtaining relevant information in push and pull implementations.

Figure 3:
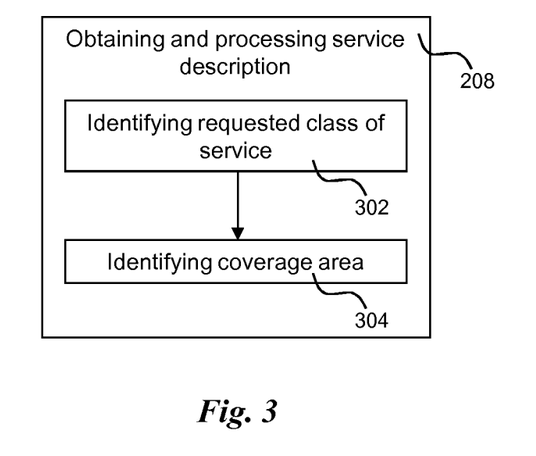
FIG. 3 and FIG. 4 are flowcharts illustrating further details of the method in further embodiments.

FIG. 3 illustrates one embodiment of the operation of obtaining and processing service description, 208. In step 302 the CAM, 110, processes that service description by identifying class of service of the requested service. The service descriptor disclosed earlier illustrates format and Table 1 presented earlier in this document gives examples of the information elements present in the service description. Because by the class of service we mean a service or a group of services with the same requirements in terms of bandwidth, latency, CPU, memory, by analysing the content of the service description it is possible to identify the class of service of the requested service. The CAM, 110, also identifies, 304, the coverage area where the service is requested to operate at the class identified at step 302. In one embodiment the service description comprises information indicative of the coverage area. This information may explicitly identify the coverage area, for example using latitude and longitude coordinates. In alternative embodiments the coverage area may be given implicitly, for example by description of the service, for example WiFi tether in tramway line number 14 in Manchester. The order of the steps 302 and 304 as illustrated in FIG. 3 and described above may be reversed or the two operations 302 and 304 may be performed in parallel. FIG. 3 illustrates just one possible embodiment of several possible.

Preferably the method also comprises forecasting, 204, service distribution in a geographical area based on results of the operation of monitoring, 202. In this preferred embodiment a starting point is that at least some of the resources are presented as available to the service requestor. This availability may be forecasted based on contracts, previous measurements, etc. . . . . . For example, there may be another service, already running in the network and it needs certain resources. However, the nature of this service is that the resources are needed until early evening hours, (e.g. 9 pm) and then not needed until 6 am. Knowing this allows to present these resources as available during nights. When a new service request arrives, the system updates the abstraction to reflect consumption of the resources by this new service and in this way allowing to determine availability of resources at any given time in the future based on currently running and newly received service requests. In principle if no forecast is available the system starts from scratch. Abstraction views are always available (each of the three domains provides its own abstracted resources independently from service requests), but it may be that they are not correlated to a forecast. In case the resources exposed by the abstraction do not meet the requirements of the service request the system verifies if it is possible to modify the abstracted views to provide alternative resources that can meet the service request. As a result, the cross-abstraction changes.

In another preferred embodiment the method comprises identifying in the abstracted resources from the radio, transport and computing domains resources in order to produce a cross-abstraction, 210. The cross-abstraction is an aggregation of the abstracted resources per geographical area and per class of service. Delivering a service in in such a system works in two main phases that are correlated and linked to each other. At the beginning the resources necessary for delivering the service are identified (e.g. as a cross-abstraction) and provided including the coverage area. In this initial phase the service is created, but is not yet operational, i.e. it is a potential service which is included in a catalogue. In the next phase the service is operated (i.e. delivered) after a request to provide the service. The requests and responses (e.g. the catalogue) are communicated via the interface 506, 610.

Producing the cross-abstraction after obtaining the information comprising abstracted resources from the three domains is advantageous because it gives the information representing the capability of the infrastructure to provide resources (radio, transport and computing) capable to deliver services at a specific class of service and identifies geographical area where this class of service can be delivered while end users move about this geographical area and still enjoy the service. This, in turn, makes processing of a new service request with its associated service description easier because the initial work has already been done. In the following step the operation of identifying the resources for delivering the service defined in the service description is performed on said cross-abstraction.

In alternative embodiment the information on abstracted resources from the three domains waits at the CAM, 110, until a service request and service description arrive and the CAM, 110, works on the on abstracted resources from the radio, transport and computing domains. In this embodiment the cross-abstraction is produced on-the-fly. In yet another alternative the method comprises identifying resources from the three domains required to deliver the requested service based on information comprising abstracted resources from radio, transport and computing domains and the service description comprising information indicative of the required coverage area and class of service. This last embodiment may be advantageous in delivering simple services requiring mobility of users, e.g. providing a WiFi tether in a tramway running a fixed route through a city. Such a simple service does not require full cross-abstraction and can be done based by identifying resources from the three domains rather than processing all information to produce the cross-abstraction.

In different embodiments the definition of the class of service can be done according different criteria, e.g. a class of service represents the final user services (e.g. cloud robotics), or it represents a sub-service with same requirements, for example, in the cloud robotics scenario robot monitoring is performed with medium latency and robot control is performed with very low latency. Such two sub-services can be considered as different class of services. In consequence, the definition of class of service and its mapping into the coverage area can be based on such different criteria. For example, for each geographical coverage area, it possible to create a sort of "virtual coverage areas" where the different classes of service are mapped.

In one embodiment the service description comprises information indicative of the coverage area. As explained earlier this information may be given explicitly or implicitly in the service description.

Based on the services priority, the performance and data centre (DC) requirements, the system aggregates the abstracted resources provided by radio, transport and computing domains exposing for the different coverage area a cross-abstraction that takes into account the network and performance requirements, service isolation and mobility support. If there is an overlap among different coverage areas the resources exposed for each coverage area are different according to the priority of services and the requirements of the specific class of service. The term "exposed" refers to the resources presented as available to the service requestor. They could be allocated, allocated and configured or not allocated. This depends on the policy and technology of the domains (e.g. in case of optical network usually the resource is allocated because it requires a lot of time to be configured, in case of packet technology the configuration time is very fast but in this case the decision on whether the resources should be allocated or not depends on the priority associated with the service. For example, let's suppose to have packet technology and multiple services. Some of them with high priority and high latency, other lower priority and low latency; in this case it could be reasonable to allocate and configure the resource for high priority and high latency and keep some resources not allocated in advance to share for low priority and low latency. The latency is characteristic of the network (high latency=long delays, low latency=small delays). The present invention can work with any type of policy of the different domains.

Moreover, by monitoring the services and resource utilization the system, 100, is able to update the abstraction views for a particular coverage area according to the real service distribution. In this way any change, such as the number of end users, mobility of end users (and their UEs/terminals), fluctuation of channel status, etc., will cause an adjustment of the abstraction views without causing changes in resource allocation for other services guaranteeing service isolation.

Within a coverage area, by tracking user location, it is possible to maintain service continuity by keeping a user connected when its point of connection to the network moves from one access point (or base station) to another.

Figure 4:
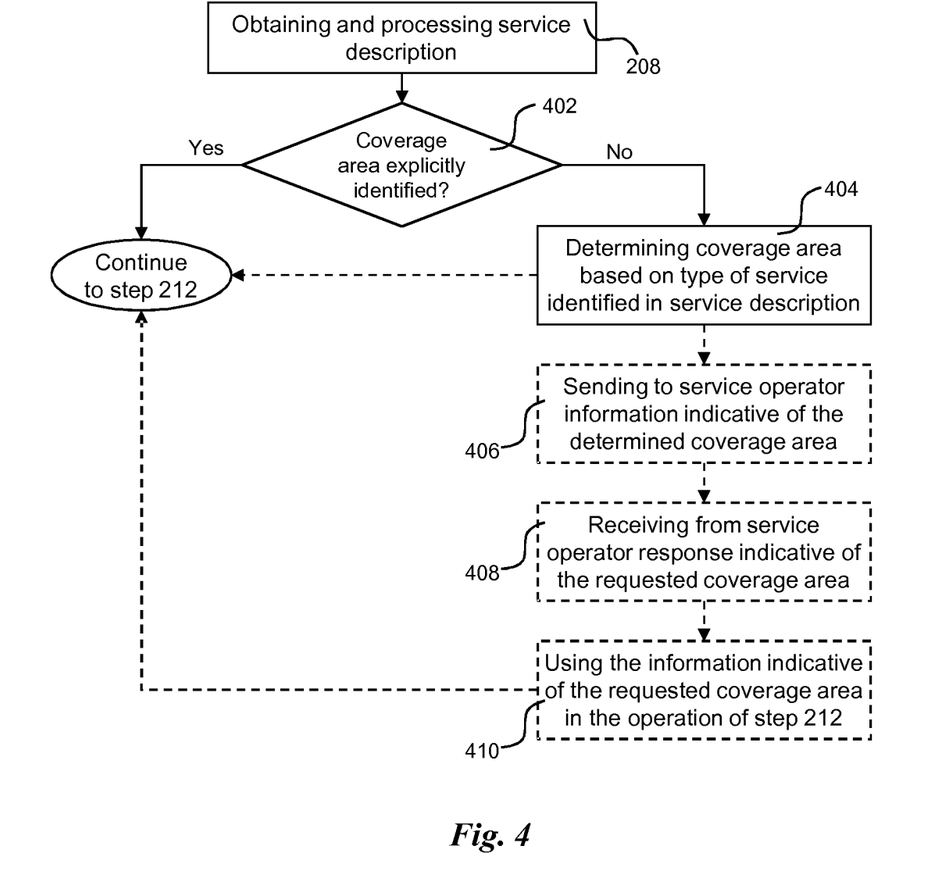

FIG. 4 illustrates further alternative operations of the method illustrated in embodiments shown in FIGS. 2 and 3 5. In this embodiment if the service description comprises information explicitly identifying coverage area, 402—Yes, the method continues to step 212 (i.e. identifying in the abstracted resources from the radio domain, transport domain and computing domain resources for delivering the service defined in the service description in a coverage area determined based on the service description). Alternatively, if the service description does not comprise explicit information indicative of the coverage area, 402-No, the method comprises determining the coverage area based on a type of service identified in the service description, 404. For example, if the service description (type of service field) explains the application of the service is real time reporting of certain blood parameters of a mobile patient it may be inferred from this that the coverage should be the maximum coverage the network can provide. In another example the service may be WiFi tether in tramway line number 14 in Manchester from which the geographical coverage may also be inferred. In another embodiment the CAM, 110, may also use information included in the service request corresponding to the service description in order to determine the coverage area. Using information from a service request may supplement the information obtained (obtainable) from service description or the method may use only the information obtained from the service description.

The method then comprises two alternative embodiments. In the first embodiment the coverage area is taken to be the one inferred from the service information and/or possibly from its corresponding service request and the method continues to step 212.

The second embodiment includes dialog with service operator who requested the service. In step 406 shown in FIG. 4 the service operator requesting the network service is provided with information indicative of the determined coverage area. This is the coverage area inferred from the service information and/or possibly from its corresponding service request. In the next step a response from the service operator is received indicative of the requested coverage area, 408. This may be a simple confirmation that the coverage area provided in step 406 should be used or the response may include a different coverage area for use in the method. Finally, the method comprises using, 410, the information indicative of the requested coverage area, indicated by service operator's response, in the operation of step 212.

The above embodiment illustrated in FIG. 4 may be also explained with reference to the earlier mentioned example of collision avoidance. Once the CAM, 110, receives the service description, 208, and determines that the service description does not comprise explicit identification of a coverage area, 4012—No, the CAM, 110, processes the service description and finds that the type of service field contains value automotive—collision avoidance. Based on this value the CAM determines coverage area to be a network of corridors along roads in a country in which this network operates, 404. In one alternative embodiment this coverage area may be used for identifying in the abstracted resources from the three domains the resources required for delivering the service defined in the service description along the roads, 212. Preferably, however, the CAM, 110, sends the information identifying the coverage area determined in step 404 as explained above to the service operator, 406. The service operator may respond in for example by confirming that the coverage area determined in step 404 should be used or the service operator may modify the coverage area and specify that the collision avoidance service will be deployed at crossroads (e.g. 500 meters along each A-road, 200-meters along each B-road, and 1000 meters along motorways near exits). The CAM receives, 408, this response and uses, 410, the information indicative of the coverage area for identifying in the abstracted resources from the three domains the resources required for delivering the service defined in the service description.

Preferably the method further comprises allocating the identified resources to the requested service.

On the basis of service request and corresponding service description resources in the coverage are identified, then the availability of the resources is verified in the coverage area. These operations can be performed in accordance with several parameters and criteria. The simplest embodiment considers that all the resources belonging to the coverage area are utilized concurrently by the service during whole duration of the service. In this case all the resources at the peak are booked until the service is terminated. A second embodiment considers the amount of time each of the resources is occupied. This approach considers mobility of the user (i.e. that the user is moving with his/her UE and where it is going), hence the use of the resources varies while the user move. This second embodiment benefits from availability of characteristic of the service which then allows to derive the use of the resource at the time the service is delivered. This characteristic may be provided by the service operator or be determined by the CAM, 110, monitoring usage of the resources as a function of time. This may be particularly effective in the case of repetitive services, for example the WiFi tether on board of a tramway is very repetitive and easy to predict—the radio resources are needed where the tramway car is located, and the tramway goes along a well-defined route according to a timetable. Hence, it is easy to predict which resources will be needed and when they will be needed by analysing usage of these resources over a few days (the length of the learning period will depend on whether there is a different timetable for weekdays and weekends).

FIG. 5 illustrates one embodiment of an apparatus, 500, which implements the method of orchestrating a plurality of network resources for providing a requested network service in a mobile communications network described earlier.

The apparatus, 500, may include processing circuitry (one or more than processor) 502 coupled to the interface(s) 506, and to the memory 504. By way of example, the interface(s) 506, the processor(s) 502, and the memory 504 could be connected in series as illustrated in FIG. 5. Alternatively, these components 502, 504 and 506 may be coupled to an internal bus system of the apparatus, 500. The memory 804 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory, 504, may include software, 512, and/or control parameters, 514. The memory, 504, may include suitably configured program code to be executed by the processor(s), 502, so as to implement the above-described method as explained in connection with FIGS. 1-4.

It is to be understood that the structures as illustrated in FIG. 5 are merely schematic and that the apparatus, 500, may actually include further components which, for the sake of clarity, have not been illustrated, e.g., further interfaces or processors. Also, it is to be understood that the memory 504 may include further program code for implementing other and/or known functionalities.

According to some embodiments, also a computer program may be provided for implementing functionalities of the apparatus 500, e.g., in the form of a physical medium storing the program code and/or other data to be stored in the memory 504, or by making the program code available for download or by streaming.

It is also to be understood that the apparatus 500 may be provided as a virtual apparatus 500. In one embodiment, the apparatus 500 may be provided in distributed resources, such as in cloud resources. When provided as a virtual apparatus, it will be appreciated that the memory 504, processing circuitry 502, and interface 506 may be provided as functional elements. The functional elements may be distributed in a logical network and not necessarily be directly physically connected. It is also to be understood that the apparatus 500 may be provided as a single-node device, or as a multi-node system.

In a preferred embodiment the apparatus, 500, for orchestrating a plurality of network resources for providing a requested network service in a mobile communications network comprises a processing circuitry, 502 and a memory, 504. The memory, 504, containing instructions in a form of a software code, 512, which are executable by the processing circuitry, 502. When the software code comprising the instructions is executed the apparatus, 500, is operative to monitor service requests and receive (or download) information comprising abstracted resources of radio domain, transport domain and computing domain. The options for receiving or downloading were already discussed in description of the method and the same is applicable to embodiments of an apparatus implementing the method. The apparatus, 500, is also operative to obtain and process a service description comprising a set of parameters defining the service to be provided. In one embodiment processing of the service description leads to identifying class of service of the requested service. The service descriptor disclosed earlier illustrates format and Table 1 presented earlier gives examples of the information elements present in the service description. The processing also allows the apparatus 500 to identify the coverage area where the service is requested to operate at the class of service identified as described earlier identified. In one embodiment the service description comprises information indicative of the coverage area. This information may explicitly identify the coverage area, for example using latitude and longitude coordinates. In alternative embodiments the coverage area may be given implicitly, for example by description of the service, for example WiFi tether in tramway line number 14 in Manchester. The apparatus, 500, is further operative to identify in the abstracted resources from the three domains the resources for delivering the service defined in the service description in a coverage area determined based on the service description.

FIG. 6 illustrates alternative embodiment of an apparatus, 600, which implements the method of orchestrating a plurality of network resources for providing a requested network service in a mobile communications network described earlier. The apparatus, 600, comprises a monitor module or function, 602, for monitoring service requests. The service requests arrive from service operators (directly on indirectly) at the interface 610. The apparatus also comprises a module for obtaining, 604, information comprising abstracted resources of radio domain, transport domain and computing domain and a processing module, 606, for obtaining and processing a service description comprising a set of parameters defining the service to be provided. As explained earlier obtaining may include receiving or downloading in embodiments of this invention. The apparatus, 600, also comprises a module for identifying, 608, in the abstracted resources from the three domains resources for delivering the service defined in the service description in a coverage area determined based on the service description.

In the embodiments illustrated in FIGS. 5 and 6 and described in this document the apparatus 500 and 600 operates as the cross-abstraction manager (CAM) 110 shown in FIG. 1 and is operative to carry out the embodiments of the method described above with reference to FIGS. 2, 3 and 4.

Preferably the apparatus, 500, 600, 110, is configured to identify in the abstracted resources from the radio, transport and computing domains resources to produce a cross-abstraction, wherein said cross-abstraction aggregates the abstracted resources per geographical area and per class of services. The apparatus is further configured to perform the operation of identifying the resources for delivering the service defined in the service description on said cross-abstraction. In a preferred embodiment the service description comprises information indicative of the coverage area. This may be an explicit indication using geographical coordinates or some other descriptive identification of the coverage area, e.g. 2 km on either side of bridge over river Avon along M40 motorway.

If the service description does not comprise information indicative of the coverage area the apparatus, 500, 600, 110, is operative to determine the coverage area based on a type of service identified in the service description. Preferably the content of the service type field is used to determine the coverage area on its own, or in combination with information obtained from a corresponding service request.

When the service description does not comprise information indicative of the coverage area in one embodiment the apparatus 500, 600, 110 takes the coverage area inferred from the service description (preferably with supporting information obtained from the corresponding request). However, in a preferred embodiment, in order to provide a bespoke service, the apparatus, 500, 600, 110, initiates dialog with the service operator to get the coverage area determined accurately. The apparatus is configured to provided provide the service operator requesting the network service with information indicative of the determined coverage area inferred from service description (and in some embodiments also from the corresponding service request) and then obtain a response indicative of the requested coverage area from the service operator. The apparatus is configured to use the information indicative of the requested coverage area as indicated in the service operator's response to identify in the abstracted resources from the radio, transport and computing domains resources for delivering the service defined in the service description.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of orchestrating a plurality of network resources for providing a requested network service in a mobile communications network, the method comprising:
   monitoring service requests;
   obtaining information comprising abstracted resources of radio domain, transport domain and computing domain;
   obtaining and processing a service description comprising a set of parameters defining the service to be provided;
   identifying resources in the abstracted resources from the radio domain, transport domain and computing domain to produce a cross-abstraction, wherein said cross-abstraction aggregates the abstracted resources per geographical area and per class of services;

identifying resources in the cross-abstraction for delivering the service defined in the service description in a coverage area determined based on the service description.

2. The method according to claim 1 further comprising forecasting service distribution in a geographical area based on results of the operation of monitoring.

3. The method according to claim 1, wherein the service description comprises information indicative of the coverage area.

4. The method according to claim 1, wherein if the service description does not comprise information indicative of the coverage area the method comprises determining the coverage area based on a type of service identified in the service description.

5. The method according to claim 4 wherein if the service description does not comprise information indicative of the coverage area the method comprises:
- determining the coverage area based on a type of service identified in the service description,
- providing the service operator requesting the network service with information indicative of the determined coverage area,
- obtaining from the service operator a response indicative of the requested coverage area, and
- using the information indicative of the requested coverage area, indicated by service operator's response, in the operation of identifying in the abstracted resources from the radio domain, transport domain and computing domain resources for delivering the service defined in the service description.

6. The method according to claim 1, further comprising allocating the identified resources to the requested service.

7. An apparatus for orchestrating a plurality of network resources for providing a requested network service in a mobile communications network, the apparatus comprising a processing circuitry and a memory, the memory containing instructions executable by the processing circuitry such that the apparatus is operative to:
- monitor service requests;
- obtain information comprising abstracted resources of radio domain, transport domain and computing domain;
- obtain and process a service description comprising a set of parameters defining the service to be provided;
- identify resources in the abstracted resources from the radio domain, transport domain and computing domain to produce a cross-abstraction, wherein said cross-abstraction aggregates the abstracted resources per geographical area and per class of services;
- identify resources in the cross-abstraction for delivering the service defined in the service description in a coverage area determined based on the service description.

8. The apparatus according to claim 7 operative to forecast service distribution in a geographical area based on results of the operation of monitoring.

9. The apparatus according to claim 7, wherein the service description comprises information indicative of the coverage area.

10. The apparatus according to claim 7, wherein if the service description does not comprise information indicative of the coverage area the apparatus is operative to determine the coverage area based on a type of service identified in the service description.

11. The apparatus according to claim 10 wherein if the service description does not comprise information indicative of the coverage area the apparatus is operative to:
- determine the coverage area based on a type of service identified in the service description,
- provide the service operator requesting the network service with information indicative of the determined coverage area,
- obtain from the service operator a response indicative of the requested coverage area, and
- use the information indicative of the requested coverage area, indicated by service operator's response, to identifying in the abstracted resources from the radio domain, transport domain and computing domain resources for delivering the service defined in the service description.

12. The apparatus according to claim 7 further operative to allocate the identified resources to the requested service.

13. A computer program product comprising non-transitory computer readable media having stored thereon a computer program comprising instructions which, when executed on at least one processor, cause the at least one processor to carry out a method according to claim 1.

* * * * *